United States Patent [19]
Edwards

[11] Patent Number: 5,365,969
[45] Date of Patent: Nov. 22, 1994

[54] FLOAT WITH SKIRT TO PREVENT LEAKAGE DUE TO OVERSUDSING

[75] Inventor: James M. Edwards, Kinston, N.C.

[73] Assignee: White Consolidated Industries, Inc., Cleveland, Ohio

[21] Appl. No.: 184,569

[22] Filed: Jan. 21, 1994

[51] Int. Cl.$^5$ .................. H01H 35/18; F16K 31/18; F16K 33/00

[52] U.S. Cl. .................. 137/387; 73/322.5; 134/56 D; 134/57 D; 134/58 D; 137/215; 137/412; 137/429; 200/84 R

[58] Field of Search .............. 68/208; 73/306, 309, 73/322.5; 134/56 D, 56 R, 57 D, 58 D; 137/215, 216, 387, 412, 413, 429, 430; 200/83 WM, 84 R

[56] References Cited

U.S. PATENT DOCUMENTS

| | | | |
|---|---|---|---|
| 3,174,489 | 3/1965 | Jellies et al. | 134/57 D |
| 3,183,923 | 5/1965 | Henrikson | 137/387 |
| 3,464,437 | 9/1969 | Zane | 137/387 |
| 3,495,617 | 2/1970 | Zifferer | 137/433 |
| 3,610,271 | 10/1971 | Jarvis | 137/412 |
| 3,643,681 | 2/1972 | Simmons | 137/429 |
| 3,693,649 | 9/1972 | Gordon | 73/322.5 |
| 3,721,783 | 3/1973 | Hancock | 200/84 R |
| 3,829,636 | 8/1974 | Scott | 134/57 D |
| 3,885,580 | 5/1975 | Cushing | 137/387 |
| 3,894,555 | 7/1975 | Payne | 137/412 |
| 4,119,116 | 10/1978 | Johnson et al. | 137/387 |
| 4,178,957 | 12/1979 | Hoffman et al. | 137/387 |
| 4,180,085 | 12/1979 | Berges et al. | 137/387 |
| 4,180,095 | 12/1979 | Woolley et al. | 137/387 |
| 4,237,919 | 12/1980 | Crawford | 137/216 |
| 4,256,136 | 3/1981 | Crawford | 137/429 |
| 4,271,861 | 6/1981 | Crawford | 134/56 D |
| 4,289,154 | 9/1981 | Quayle | 200/84 R |
| 4,301,829 | 11/1981 | Rowe | 134/57 D |
| 4,703,653 | 11/1987 | Schoepe et al. | 73/322.5 |
| 5,018,550 | 5/1991 | Burdorff | 137/387 |

Primary Examiner—George L. Walton
Attorney, Agent, or Firm—Pearne, Gordon, McCoy & Granger

[57] ABSTRACT

An improved float to prevent over-filling of a dishwashing machine including a cylindrical main float body, a skirt attached to the main float body and extending outwardly and downwardly therefrom, and a float stem. The main float body includes a lower portion which extends downwardly beyond a lower terminal portion of the skirt, and serves as a suds stop to prevent suds created during operation of the dishwasher from rising up within the hollow interior of the main float body and flowing down a stand pipe upon which the float is mounted. The lower portion of the main float body includes a slotted opening which serves as a vacuum breaker to prevent a vacuum from being created within the main float body which would cause the float to adhere to bottom wall of the dishwasher tub.

17 Claims, 3 Drawing Sheets

FLOAT WITH SKIRT TO PREVENT LEAKAGE DUE TO OVERSUDSING

BACKGROUND OF THE INVENTION

1. Field of the Invention

The present invention pertains to fill-control devices for dishwashing machines and, more particularly, to floats which prevent over-filling of dishwashing machines.

2. Description of the Related Art

Dishwashing machines typically include a fill or inlet valve which is operable to admit water into an interior of a dishwasher tub. A timer is usually provided to open the fill or inlet valve for a predetermined time at the beginning of each wash cycle to thereby admit a volume of water necessary to clean the dishes housed within the tub. In order to safeguard against over-filling the tub due to variations in water pressure, floats have been employed which actuate switches or control means that turn off or close the fill or inlet valve when the water level within the dishwasher tub reaches or exceeds a predetermined level.

U.S. Pat. No. 5,018,550, the disclosure of which is expressly incorporated herein in its entirety, is exemplary of such fill control floats. The '550 float has a generally cylindrical body with an outwardly and downwardly extending skirt, and a centrally located float stem. The lower edges of the cylindrical body and skirt are co-planar. The stem projects downwardly from the cylindrical body through a stand pipe provided by the tub bottom, and actuates a control switch when water level within the tub reaches a predetermined level, thereby closing the inlet valve. Downward movement of the float is limited by engagement with the stand pipe in which the float stem is inserted and spaces the lower edges of the cylindrical body and skirt a distance away from the bottom of the tub, allowing suds to rise up within the interior of the cylindrical body and flow down the stand pipe. Means are provided to automatically capture and retain the float stem upon insertion thereof into the stand pipe.

Expired U.S. Pat. No. 3,894,555, the disclosure of which is expressly incorporated herein by reference, provides a similar float having a cylindrical main body and an outwardly and downwardly extending skirt. A terminal portion of the skirt extends downwardly beyond a terminal portion of the main body. During operation, the lower edge of the cylindrical main body is spaced a distance from the tub bottom, allowing suds to rise up within the interior of the main body and flow down the stand pipe. A float stem extends downwardly through a stand pipe and is operable to actuate a control switch to control a water inlet valve.

U.S. Pat. Nos. 4,256,136 and 4,301,829, the disclosures of which are expressly incorporated herein by reference, provide a float which is housed within a cover member at the bottom of the dishwasher tub. The float includes a pair of cylindrical walls which define concentric annular chambers. The inner annular chamber receives a stand pipe which, in turn, receives a float stem. The cover member retains and guides the float, and is provided with notched openings to enable water to pass into the interior of the cover member and move the float vertically. During operation, the lower edges of the cylindrical walls are spaced a distance from the tub bottom wall, allowing suds to rise up within the inner annular chamber and flow down the stand pipe.

U.S. Pat. No. 4,289,154, the disclosure of which is expressly incorporated herein by reference, discloses a self-cleaning float which has an open construction to allow food particles and the like to be rinsed from the interior of the float. The float includes a central shaft, an upper bowl-shaped member, and inner and outer concentric walls. The outer wall extends below the inner wall while the bowl-shaped member is directly attached to the shaft and overlies an open end of a stand pipe. Arms connect the bowl-shaped member to the inner and outer walls.

The prior art over-fill preventing floats suffer from the disadvantage that, when oversudsing occurs, as is common when hard water is used, suds may rise up within the float and flow down the stand pipe and onto the floor, giving the user the impression that there is a tub leak. Therefore, there exists a need in the art for a float which prevents or otherwise minimizes suds from reaching the stand pipe. There also exists a need in the art for such a float which includes means to prevent a vacuum from being created within the interior of the float which would cause the float to be adhered to the bottom of the tub.

SUMMARY OF THE INVENTION

The present invention provides an improved float which solves the above-noted problems found in the prior art. The improved float of the present invention is adapted to be slidably mounted to a stand pipe provided at a bottom of a dishwashing machine tub, and cooperates with a water introduction means to control the amount of water in the dishwashing tub.

In accordance with the present invention, the improved float includes a main float body, a skirt, and a float stem. The main float body has a generally cylindrical sidewall, a closed upper end, an open lower end, and a generally hollow interior. The skirt is attached to the main float body and extends outwardly and downwardly therefrom. The float stem projects from the open lower end of the main float body and is slidably received by the stand pipe. The float stem is operable to actuate water inlet controlling means to prevent further introduction of water into the tub when a predetermined desired water level has been reached.

In further accordance with the present invention, a portion of the main float body sidewall extends downwardly beyond a lower terminal end of the skirt and serves as a suds stop to prevent or minimize suds from reaching and flowing down the stand pipe. More particularly, during operation of the dishwasher a lower edge of the portion of the main float body sidewall is generally continuously beneath the surface of the water or closely adjacent a tub bottom wall and, as such, prevents the suds created during a dishwashing cycle from accumulating within the hollow interior of the main float body and flowing down the stand pipe.

In further accordance with the present invention, the portion of the sidewall which extends downwardly beyond the lower terminal end of the skirt provides a slotted opening which serves as a vacuum breaker to prevent a vacuum or suction force from being created within the interior of the float which would cause the float to adhere to the bottom of the tub.

The improved float of the present invention actuates control means which prevent further water from being added into the tub once the water within the tub reaches a predetermined level, while preventing suds from flowing down the stand pipe and preventing the float from being adhered to the bottom of the tub due to suction forces created by draining water from the tub.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
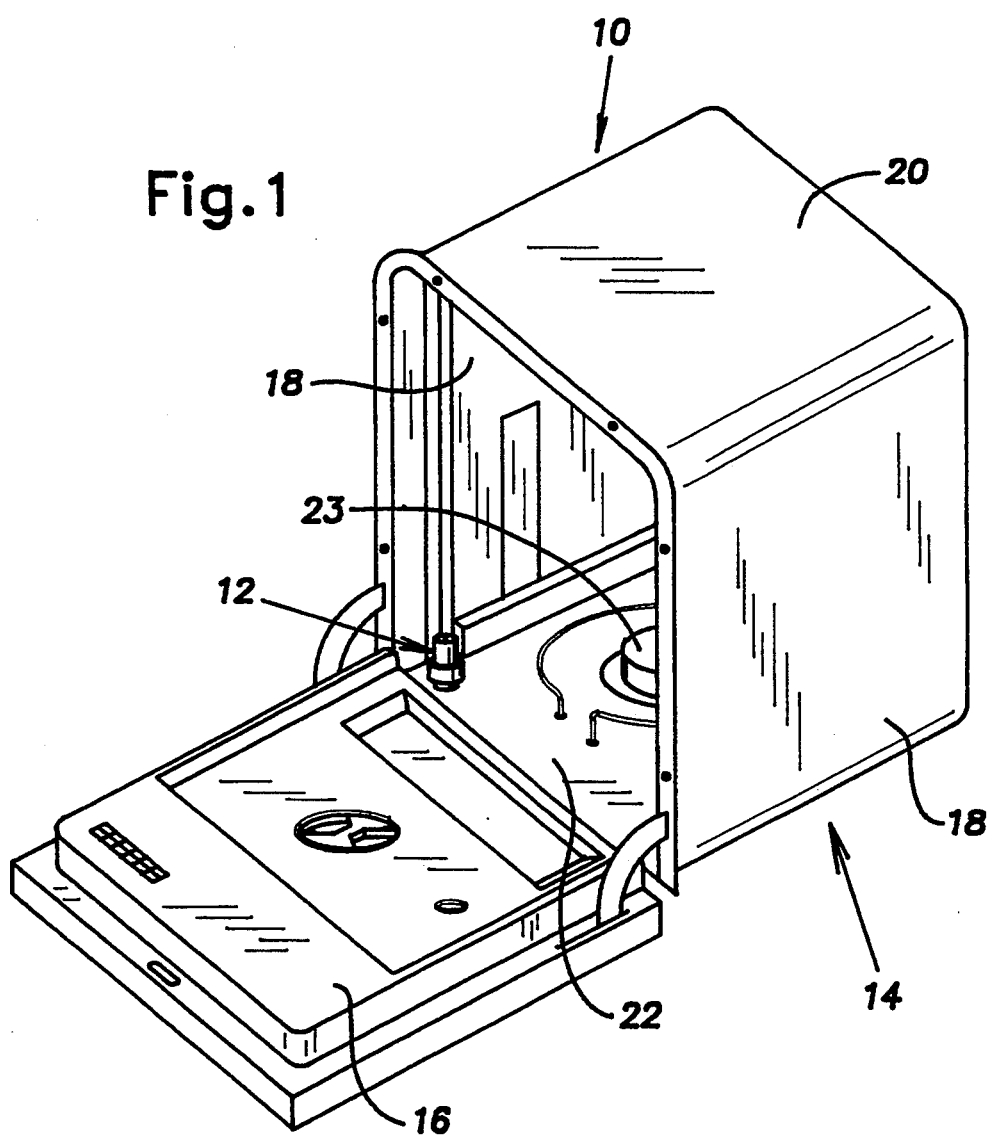
FIG. 1 is a front perspective view of a dishwashing machine incorporating the improved float according to the present invention.

With reference to the drawing figures and, in particular FIG. 1, a dishwashing machine 10 incorporating the improved float 12 of the present invention is shown. The dishwashing machine 10 includes a tub 14, a frame (not shown), and a door 16 pivotally mounted about its lower edge and shown in its open position in FIG. 1. As is conventional, the tub 14 integrally includes lateral side walls 18, a top wall 20, a rear wall (not shown), a bottom wall 22, and an open front which is closed by the pivotally mounted door 16. The bottom wall 22 defines a sump in which water is received and through which projects a portion of a dishwasher pump 23 which is operable, via one or more wash arms (not shown), to circulate wash water throughout the tub 14 and drain water from the tub. The tub bottom wall 22 provides, at a forward portion thereof, an upwardly extending stand pipe 24 upon which the float 12 is mounted, as shown best in FIGS. 5 and 6. The foregoing description of the dishwasher 10 is generally conventional and known in the art, and is included herein as background to the following description of the improved float 12 of the present invention.

Figures 2, 4:
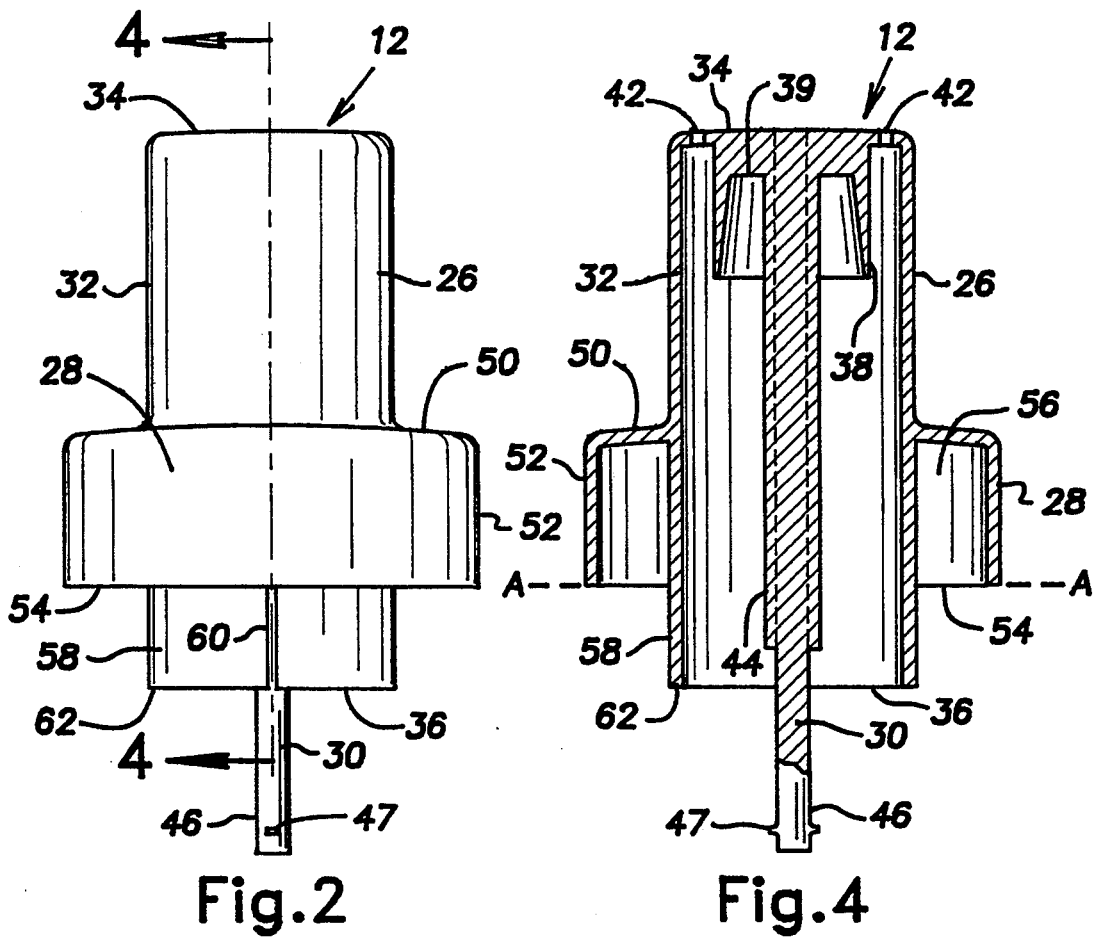
FIG. 2 is a front elevational view of the improved float according to the present invention.
FIG. 4 is a cross sectional view taken along line 4—4 of FIG. 2 of the improved float according to the present invention.
Figure 3:
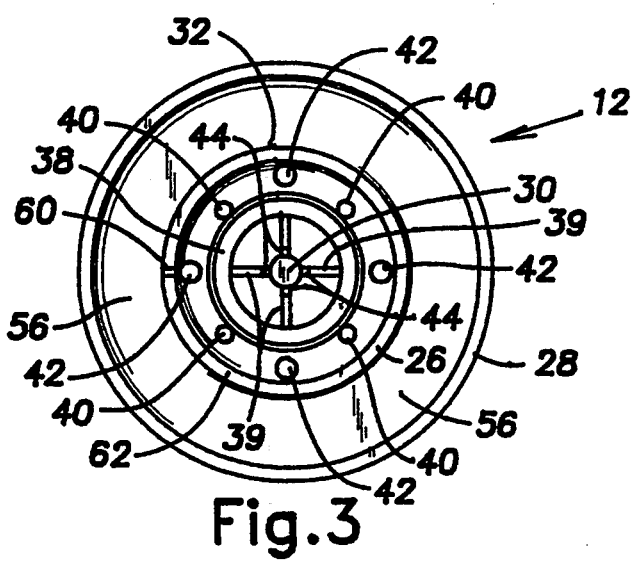
FIG. 3 is a bottom plan view of the improved float according to the present invention.

With reference to FIGS. 2–4, the improved float 12 of the present invention, which is preferably formed from polypropylene, is shown to include a generally cylindrical main float body 26, a skirt 28, and a float stem 30. The main float body 26 provides a cylindrical sidewall 32, a closed upper end 34, and an open lower end 36.

Figure 5:
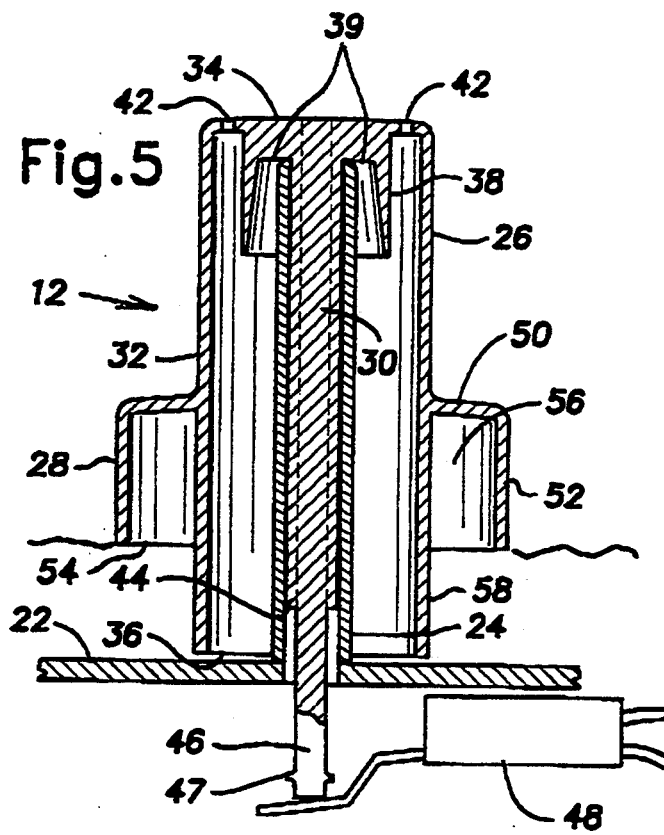
FIGS. 5 and 6 are cross-sectional views of the float and tub during operation of the dishwashing machine.

The float stem 30, a cylindrical wall 38, and a series of rods 40 project downwardly from the closed upper end 34 of the main float body 26. A series of ribs 39 interconnect the cylindrical wall 38 and the float stem 30 (FIG. 3) and engage an open end of the stand pipe 24 when the float 12 is at rest (FIG. 5). The cylindrical wall 38 is generally coaxial with the float stem 30 and surrounds the open end of the stand pipe 24 when the float 12 is at rest. The rods 40 are provided at spaced locations along and in engagement with the outer surface of the cylindrical wall 38. Vent openings 42 are formed in the closed upper end 34 of the main float body 26 at locations radially outwardly spaced from the cylindrical wall 38, i.e. between the cylindrical wall 38 and the main float body sidewall 32, as illustrated in FIG. 3. The vent openings 42 provide a fluid communication path between the hollow interior of the main float body 26 and atmosphere to allow air within the main float body to escape therefrom during filling of the dishwasher 10, as will be described more fully hereafter.

The float stem 30 extends downwardly from the center of the closed upper end 34 and is coaxial therewith. The float stem 30 includes a series of outwardly extending ribs 44 along an upper portion of its length which cooperate to center and align the float stem 30 with the stand pipe 24 as the float 12 moves up and down relative to the stand pipe 24 during operation of the dishwasher 10, as will be described more fully hereafter. As illustrated, the ribs 44 extend along only part of the length of the float stem 30, a lower portion 46 of the float stem 30 being generally cylindrical and free of the ribs 44. The lower portion 46 includes a pair of small tabs 47 which resist unintentional removal of the float 12 from the tub 14. As shown best in FIGS. 5 and 6, the lower portion 46 of the float stem 30 projects downwardly below the stand pipe 24 and engages and actuates a control switch 48 which controls operation of a fill or inlet valve (not shown).

As will be described more fully hereafter with regard to operation of the float 12, when the water level within the tub 14 is below the skirt 28 the float stem 30 engages the control switch 48 and maintains the control switch in an open position (FIG. 5), thereby allowing additional water to be admitted to the tub 14 by means of the water fill or inlet valve. When the water level within the tub 14 reaches the skirt 28, the float 12 begins to rise and, eventually, allows the control switch 48 to move to a closed position (FIG. 6) and provide a control signal that closes or turns off the water fill or inlet valve and prevents the further introduction of water into the tub 14.

The skirt 28 includes an annular wall 50 and a cylindrical wall 52. The annular wall 50 extends outwardly from the main float body sidewall 32 at a location intermediate its upper and lower ends 34, 36, as shown best in FIGS. 2 and 4–6. The skirt cylindrical wall 52 extends downwardly from a circular outer edge of the annular wall 50, and includes a circular lower terminal edge 54 which defines a plane which is labelled A—A in FIG. 4. During filling of the dishwasher 10, air is trapped within an annular channel 56 defined by the sidewall 32 of the main float body 26 and the annular and cylindrical walls 50, 52 of the skirt 28, as will be described more fully hereafter.

As shown best in FIG. 2, a lower portion 58 of the main float body sidewall 32 extends below the plane A—A defined by the lower terminal edge 54 of the skirt cylindrical wall 52. As will be apparent from the description to follow, the lower portion 58 of the main float body sidewall 32 serves as a suds stop to prevent suds created during operation of the dishwasher 10 from rising up within the hollow interior of the main float body 26 and flowing down the stand pipe 24.

A slotted opening 60 is formed in the lower portion 58 of the main float body sidewall 32. The slotted opening 60 extends from the intersection of the plane A—A with the main float body sidewall 32 to the open lower end 36 of the main float body 26. Preferably, and as illustrated, the slotted opening 60 is vertically oriented (i.e., parallel to the float stem 30). As will be described more fully hereafter, the slotted opening 60 serves as a vacuum breaker to prevent a vacuum from being created within the main float body 26 when water is circulated throughout the tub 14 or drained from the dishwasher 10. Such a vacuum or suction force could be created, for example, if food material, such as mashed potatoes, would collect around the stand pipe 24 during operation of the dishwasher in a wash mode and form a seal between a circular lower edge 62 of the lower portion 58 of the main float body sidewall 32 and the tub bottom wall 22.

Figure 6:
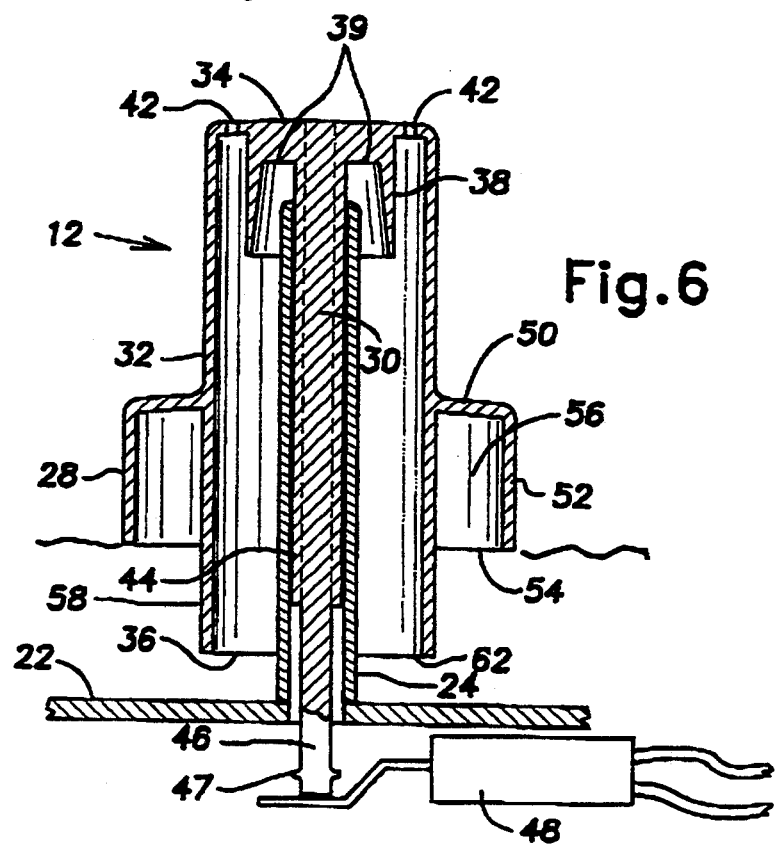

FIGS. 5 and 6 illustrate the float 12 during filling of the dishwasher 10 wherein water rises up within the sump provided by the bottom wall 22 of the dishwasher tub 14. As the water level increases, water flows under the lower edge 62 and through the slotted opening 60 in the lower portion 58 of the main float body sidewall 32 and into the hollow interior thereof while air is vented from the main float body 26 via the vent openings 42 in the closed upper end 34 to prevent the float 12 from floatingly or buoyantly moving upwardly with the water. When the water level rises sufficiently, the lower terminal edge 54 of the skirt cylindrical wall 52 is submersed, and air is trapped in the annular channel 56 defined by the skirt 28 and the main float body sidewall 32. At this point in time the float 12 is generally as illustrated in FIG. 5, wherein the ribs 39 are in engagement with the top of the stand pipe 24 and the lower portion 46 of the float stem 30 is in contact with a control switch 48, which is in its normally open position. In the illustrated and preferred embodiment, the lower edge 62 of the main float body sidewall 32 is spaced a short distance from the tub bottom wall 22 when the float 12 is at rest. Naturally, the main float body sidewall 32 could be lengthened to allow the lower edge 62 to contact or engage the tub bottom wall 22 when the float is at rest, without departing from the scope and spirit of the present invention.

Continued introduction of water into the tub 14 causes the float 12 to move vertically relative to the stand pipe 24 with the water due to the buoyancy of the air trapped in the annular channel 56. The lower portion 58 of the main float body sidewall 32 is submersed in the water, but does not significantly contribute to the buoyancy of the float 12, aside from the inherent buoyancy of the material from which the float is constructed, due to the fact that the vent openings 42 in the closed upper end 34 of the main float body 32 allow the air within the main float body 26 to escape to atmosphere. When the water level within the tub 14 reaches the predetermined desired maximum level, the float 12 is generally as illustrated in FIG. 6 wherein the float has risen vertically relative to the stand pipe 24 and tub bottom wall 22, and the control switch 48 is in the closed position. A control signal provided by the control switch 48 closes or turns off the water fill or inlet valve to prevent further water from being introduced into the tub 14. Thereafter, the dishwasher 10 is operated according to a user-selected operating cycle to clean dishes (not shown) contained within the tub 14.

When the dishwasher 10 enters a wash or circulation mode, the pump 23 draws water from the sump provided by the tub bottom wall 22 and circulates the water throughout the tub 14 and, in so doing, typically reduces the water level in the tub such that the float 12 returns to the position shown in FIG. 5. However, since the lower edge 62 is closely adjacent the tub bottom wall 22, suds created within the tub 14 will not rise up within the hollow interior of the main float body 26 to the level at which they will flow down the stand pipe 24.

In some dishwashers, an amount of water will remain within the sump even when the machine is operated in the wash or circulation mode, causing the lower terminal edge 54 of the skirt 28 to rise and fall with the water level within the tub 14. Due to turbulence created by the pump 23 and the sprayed water, the float 12 will bob up and down, causing the lower terminal edge 54 of the skirt 28 to rise above and fall below the surface of the water, and thereby allowing suds to flow under the lower edge 54 of the skirt cylindrical wall 52 and into the annular channel 56 between the skirt 28 and the main float body sidewall 32. In such circumstances the lower portion 58 of the main float body sidewall 32 will remain generally continuously submersed and will, therefore, generally prevent suds admitted into the annular channel 56 from reaching the interior of the main float body 26. A small amount of suds may enter the hollow interior of the main float body 26 via the slotted opening 60. However, this amount of suds will be minimal and will not rise up within the main float body 26 to the degree necessary to flow down the stand pipe 24.

If the lower edge 62 of the main float body sidewall 32 should become seated or sealed against the tub bottom wall 22 during operation of the dishwasher in the wash or circulation mode, the slotted opening 60 will also prevent an undesirable vacuum from being created within the hollow interior of the main float body 26.

When the water is drained from the tub 14, the top surface of the stand pipe 24 will be in contact with the float ribs 39 and the circular lower edge 62 of the lower portion 58 of the main float body 32 will be adjacent the tub bottom wall 22, as shown in FIG. 5. If the lower edge 62 is seated against the tub bottom wall 22 directly or indirectly (due to collected food material), the slotted opening 60 in the lower portion 58 of the main float body sidewall 32 allows water contained within the main float body 26 to flow out thereof, and prevents a suction force or vacuum from being created within the hollow interior of the main float body 26 which may adhere the main float body 26 to the tub bottom wall 22.

The improved float 12 of the present invention disclosed herein thus prevents suds created during operation of the dishwasher 10 from rising up within the hollow interior of the main float body 26 and flowing down the stand pipe 24 and prevents a suction force from being created within the hollow interior of the main float body which would adhere the float 12 to the bottom wall 22 of the tub 14. While the preferred embodiment of the present invention is shown and described herein, it is to be understood that the same is not so limited but shall cover and include any and all modifications thereof which fall within the purview of the invention. For example, it is contemplated that the closed upper end 34 of the main float body 26 could be replaced by a more open structure having a cylindrical cap to continuously overlie the open end of the stand pipe 24 and a series of arms to connect the cap to the cylindrical sidewall 32. It is also contemplated that the float cold be formed out of any number of materials other than polypropylene, and that the control switch disclosed herein could be replaced by an equivalent control sensor or mechanism. Moreover, the slotted opening 60 in the lower portion 58 of the main float body sidewall 32 could be replaced by a series of holes or various other suitable types or shapes of vent openings without departing from the scope and spirit of the present invention.

What is claimed is:

1. In a dishwasher having a tub with a bottom wall, means for controlling the introduction of water into said tub, a stand pipe providing communication between an interior of the tub and said control means, and an improved float for preventing overfilling of the tub, the improved float comprising:

a main float body having a generally cylindrical sidewall, an upper end, an open lower end, and a generally hollow interior;

a skirt attached to the main float body and extending outwardly and downwardly therefrom, said skirt being located intermediate said main float body upper and lower ends;

a float stem projecting from the open lower end of the main float body and being slidably received by the stand pipe, said float stem being operable to actuate said control means to prevent further introduction of water into the tub when a predetermined desired water level has been reached, wherein a portion of the main float body sidewall extends downwardly beyond a lower terminal edge of the skirt and provides a lower edge near said tub bottom wall, said portion serving as a suds stop to prevent suds from building up within the hollow interior of the main float body and flowing down the stand pipe as the float moves up and down in response to variations in the level of water in said tub.

2. In a dishwasher as recited in claim 1, wherein the portion of the sidewall which extends downwardly beyond the lower terminal edge of the skirt provides an opening which serves as a vacuum breaker to prevent a vacuum from being created within the interior of the float which would adhere the float to the bottom wall of the tub.

3. In a dishwasher as recited in claim 2, wherein the opening is generally parallel to the axis of the main float body.

4. In a dishwasher as recited in claim 3, wherein the lower terminal edge of the skirt defines a plane and the opening in the sidewall extends downwardly from the intersection of the plane with the sidewall toward the open lower end of the main float body.

5. In a dishwasher as recited in claim 4, wherein the upper end is generally closed and the float stem is attached to said closed upper end and is generally parallel to the opening.

6. In a dishwasher as recited in claim 1, wherein the float stem includes a series of radially extending ribs which serve as a guide to engage an inner wall of the stand pipe and align the float with the stand pipe as the float moves up and down relative to the stand pipe during operation of the dishwasher.

7. In a dishwasher as recited in claim 6, wherein the portion of the sidewall which extends downwardly beyond the lower terminal edge of the skirt provides a slotted opening which serves as a vacuum breaker to prevent a vacuum from being created within the interior of the float which would adhere the float to the bottom wall of the tub.

8. In a dishwasher as recited in claim 7, wherein the upper end is generally closed and the float stem is attached to said closed upper end and is generally parallel to the slotted opening.

9. In a dishwasher as recited in claim 7, wherein the lower terminal edge of the skirt defines a plane and the slotted opening in the sidewall extends downwardly from the intersection of the plane with the sidewall toward the open lower end of the main float body.

10. In a dishwasher having a tub with a bottom wall, means for controlling the introduction of water into the tub, a stand pipe providing communication between an interior of the tub and said control means, and an improved float for preventing overfilling of the tub, the improved float comprising:

a main float body having a generally cylindrical sidewall, a generally closed upper end, an open lower end, and a generally hollow interior, said upper end providing a vent opening to allow communication between the hollow interior and atmosphere;

a skirt attached to the main float body and extending outwardly and downwardly therefrom, said skirt being located intermediate said main float body upper and lower ends;

a float stem projecting from the open lower end of the main float body and being slidably received by the stand pipe, said float stem being operable to actuate said control means to prevent further introduction of water into the tub when a predetermined desired water level has been reached, wherein a portion of the sidewall extending adjacent the open lower end of the main body provides a lower edge which is near said tub bottom wall, said portion also providing an opening which serves as a vacuum breaker to prevent a vacuum from being created within the hollow interior of the main float body which would adhere the float to the bottom wall of the tub when the water is drained from the tub.

11. In a dishwasher as recited in claim 10, wherein the portion of the main float body sidewall extends downwardly beyond a lower terminal edge of the skirt and serves as a suds stop to prevent suds from building up within the hollow interior of the main float body and flowing down the stand pipe as the float moves up and down in response to variations in the level of water in said tub.

12. In a dishwasher as recited in claim 11, wherein the float stem is attached to the closed upper end of the main float body and is generally parallel to the opening.

13. In a dishwasher as recited in claim 12, wherein the lower terminal edge of the skirt defines a plane and the opening in the sidewall extends downwardly from the intersection of the plane with the sidewall toward the open lower end of the main float body.

14. In a dishwasher as recited in claim 10, wherein the float stem includes a series of radially extending ribs which serve as a guide to slidably engage an interior surface of the stand pipe and align the float therewith as the float moves up and down relative to the stand pipe during operation of the dishwasher.

15. In a dishwasher as recited in claim 14, wherein the portion of the main float body sidewall extends downwardly beyond a lower terminal edge of the skirt and serves as a suds stop to prevent suds from building up within the hollow interior of the main float body and flowing down the stand pipe as the float moves up and down in response to variations in the level of water in said tub.

16. In a dishwasher having a tub with a bottom wall, means for controlling the introduction of water into said tub, a stand pipe providing communication between an interior of the tub and said control means, and an improved float for preventing overfilling of the tub, the improved float comprising:

a main float body having a generally cylindrical sidewall, a closed upper end, an open lower end, and a generally hollow interior, said upper end defining at least one vent opening to allow communication between the hollow interior and atmosphere;

a skirt attached to the main float body and extending outwardly and downwardly therefrom, said skirt being generally coaxial with said main float body and being located intermediate said main float body upper and lower ends;

a float stem extending downwardly from the closed upper end of the main float body and projecting from the open lower end thereof, said float stem providing a series of laterally extending ribs along its length which slidably engage an interior wall of the stand pipe and align the float stem and float therewith as the float moves up and down relative to the stand pipe during operation of the dishwasher, said float stem being generally coaxial with the skirt and main float body and operable to actuate said control means to prevent further introduction of water into the tub when a predetermined desired water level has been reached, wherein a portion of the sidewall extends downwardly beyond a lower terminal edge of the skirt and provides a lower edge near said tub bottom wall, said lower portion serving as a suds stop to prevent suds from building up within the hollow interior of the main float body and flowing down the stand pipe as the float moves up and down in response to variations in the level of water in said tub, said portion providing a slotted opening which serves as a vacuum breaker to prevent a vacuum from being created within the interior of the float which would adhere the float to the bottom wall of the tub.

17. In a dishwasher as recited in claim 16, wherein the lower terminal edge of the skirt defines a plane and the slotted opening in the sidewall extends downwardly from the intersection of the plane with the sidewall toward the open lower end of the main float body.

* * * * *